United States Patent [19]

Littig et al.

[11] Patent Number: 5,524,276
[45] Date of Patent: Jun. 4, 1996

[54] UNIVERSAL RADIO WITH ADAPTIVE MEMORY

[75] Inventors: Stefan G. Littig, Arlington Heights; Pamela A. Dillard, Lake Zurich, both of Ill.

[73] Assignee: Motorola, Schaumburg, Ill.

[21] Appl. No.: 158,077

[22] Filed: Nov. 26, 1993

Related U.S. Application Data

[63] Continuation of Ser. No. 648,495, Jan. 30, 1991, abandoned.

[51] Int. Cl.$^6$ .............................. H04B 1/38; H04Q 7/32
[52] U.S. Cl. .................... 455/33.1; 455/54.1; 455/89; 455/186.1; 379/58
[58] Field of Search .................................. 455/33.1, 33.2, 455/54.1, 54.2, 56.1, 88, 89, 90, 185.1, 186.1, 186.2; 379/58, 59, 60, 61, 63, 355, 356; 371/10.1; 395/700, 600

[56] References Cited

U.S. PATENT DOCUMENTS

| | | |
|---|---|---|
| 4,508,935 | 4/1985 | Mastromoro . |
| 4,593,155 | 6/1986 | Hawkins . |
| 4,594,591 | 6/1986 | Burke . |
| 4,622,695 | 11/1986 | Whiting . |
| 4,628,478 | 12/1986 | Henderson, Jr. . |
| 4,680,787 | 7/1987 | Marry . |
| 4,792,986 | 12/1988 | Garner et al. . |
| 4,800,582 | 1/1989 | D'Agosto, III et al. ............ 379/355 |
| 4,805,211 | 2/1989 | Brennan et al. ............ 379/355 |
| 4,811,377 | 3/1989 | Krolopp et al. . |
| 5,029,233 | 7/1991 | Metroka ............ 455/11.1 |

FOREIGN PATENT DOCUMENTS

| | | |
|---|---|---|
| 0378450 | 7/1990 | European Pat. Off. . |
| 2118340 | 10/1983 | United Kingdom . |

Primary Examiner—Reinhard J. Eisenzopf
Assistant Examiner—Thanh Le
Attorney, Agent, or Firm—Kevin D. Kaschke

[57] ABSTRACT

A universal radio (401) having an adaptive memory is used by field service centers to give a radio user immediate access to a radio system regardless of the model type of the user's defective radio (403) while the defective radio (403) is being repaired. An information set in the defective radio's memory is transferred into the universal radio's memory for subsequent independent operation of the universal radio in the radio system.

22 Claims, 11 Drawing Sheets

5,524,276

UNIVERSAL RADIO WITH ADAPTIVE MEMORY

This is a continuation of application Ser. No. 07/648,495, filed Jan. 30, 1991 and now abandoned.

FIELD OF THE INVENTION

The present invention relates generally to RF communication systems, and more particularly to a universal radio which adapts its memory to that memory associated with any one of many radio types for subsequent independent operation in a radio system.

BACKGROUND OF THE INVENTION

Many users of cellular radios depend on uninterrupted operability of their cellular radio. For some users, such as public emergency personnel, an operational cellular radio is absolutely essential. Occasionally, a cellular radio becomes defective during use in the field which renders the cellular radio inoperable. Manufactures and dealers of cellular radios have established field service centers to repair defective cellular radios. Repairing a defective radio may take up to six weeks depending on the problem, replacement parts available, backlog of defective radios in the field service center, location of the field service center or other factors.

To accommodate the user, tile field service center transfers the memory contents from the defective radio necessarily to a new radio of the same model type as the defective radio. The new radio is given to the user permanently for continued access to the radio system. The information transfer process takes only a few minutes so the user encounters minimal inconvenience. Continued user access to the radio system is also an important advantage for field service centers which also provide radio system service. An operable radio in the user's possession results in the opportunity for increased revenues for the radio system service provider.

The new radio gives the user all the capabilities of their own radio. To transfer the memory contents the field service center temporarily intercouples the defective radio and the new radio to transfer the ESN (Electronic Security Number), NAM (Number Assignment Module), repertory directory and feature set from the user's defective radio to the new radio. Generally, transferring such information is accomplished via a memory device coupled to the data bus of a microprocessor within each radio. Once the information has been transferred from the defective radio to the new radio, the new radio can operate in the radio system independently of the defective radio. Additionally, the defective radio can no longer operate in the radio system since the ESN has been erased from its memory. Secure transfer of radio specific data has been disclosed in U.S. Pat. No. 4,811,377 on behalf of Krolopp et al. on Jul. 31, 1987.

Information transfer between defective and new radios can only occur between radios having identical model types. Identical model radios have the same software and hardware configuration. Thus, when the user brings the defective radio to a field service center, the user can get a new radio only if an identical model radio is available to accept the information. This poses a serious problem for both the field service personnel as well as the user since there are numerous radio models in use in the field. To overcome the problem and promptly provide the user with a new radio, the field service centers need to stock every model radio from the past to the present and will need to continue doing so into the future.

The cost and logistics of this field service plan is simply not reliable or realistic. If the field service center does not have the same model radio in stock corresponding to the defective radio model, the field service center cannot transfer the information between the radios. The result is lost radio operability in the radio system for the user and lost revenues for the radio system service provider while the defective radio is being repaired. For both the user and service provider this situation is very undesirable.

Thus, there is a need to overcome this increasingly painful situation by developing the equipment and process to give the user immediate access to the radio system regardless of the model type of the defective radio.

A radio system has many radios and one fixed site. The radio system comprises a universal radio and a first radio. The first radio includes an information set stored in its memory enabling communication with the fixed site. The universal radio and the first radio are intercoupled establishing communication therebetween so that the information set in the memory of the first radio may be transferred to the memory of the universal radio. The universal radio then operates in the radio system independent of the first radio.

DETAILED DESCRIPTION OF THE PREFERRED EMBODIMENT

Figure 1:
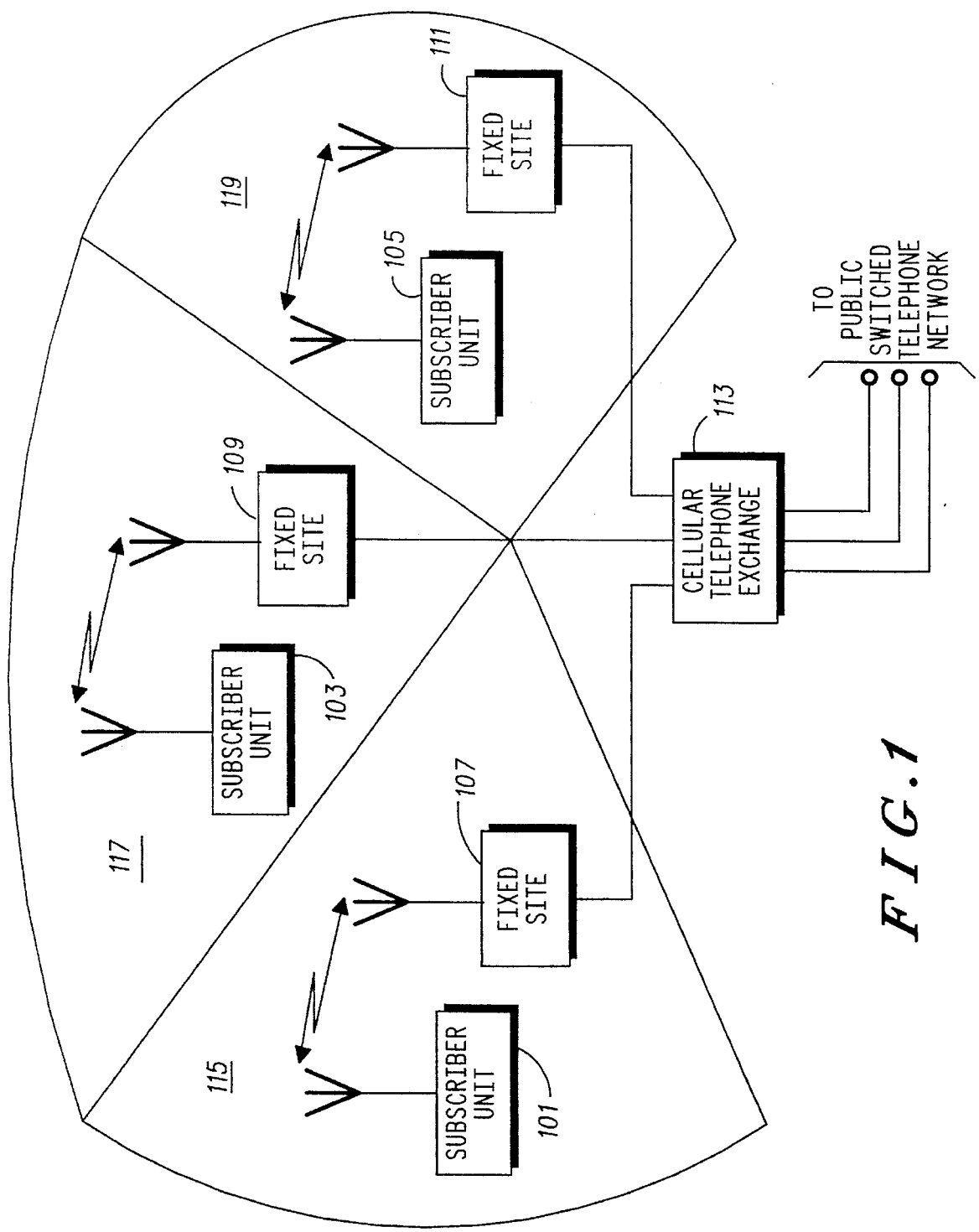
FIG. 1 is a block diagram of the basic elements of a cellular radiotelephone system in accordance with the present invention.

A radio system employing the present invention may be one such as shown in FIG. 1. In this embodiment a cellular radiotelephone system provides two-way radiotelephone; communications between the public switched telephone network and one or more subscriber units. A subscriber unit, such as unit 101 or 103, or 105, may communicate via radio waves to one of the fixed sites (107, 109, or 111), which in turn couples two-way communication through a cellular telephone exchange 113 which performs the operation of call placement, control, and interconnection with the public switched telephone network. As is well known, cellular systems are divided into discrete radio coverage areas, called cells, to provide radio coverage; over a wide geographic area. Such cells are diagrammatically shown in FIG. 1 as areas 115, 117 and 119.

Each subscriber unit primarily includes the ESN, NAM, repertory directory and feature set (the four inclusions herein called the information set). In alternate embodiments, the information set may include any data stored in the subscriber unit's memory. The ESN is unique to each subscriber unit. The NAM includes a unique telephone directory number for dialing into the public switched telephone network to access the communications link which would couple the subscriber unit to the appropriate line. The repertory directory is available to the user for quickly accessing a telephone number via a memory location. The feature set includes all programmable options set by the manufacturer which give the subscriber unit capabilities unique to its model type.

In the preferred embodiment, the subscriber unit is a hand held cellular radio herein denoted as a portable radio. Alternate embodiments may include any type radio which is compatible with the radio system such as mobile radios which are installed in vehicles. The portable radios, employed in the radio system, comprise numerous models offered by a variety of manufacturers. Each model consists of a specified feature set and may include any one of several hardware types; each hardware type may include any one of many software versions. Each software version may include one of two serial communication protocols. The combination of model types are numerous. As previously mentioned, replacing any one of the defective radio model types with a new radio requires the new radio to be an identical model type.

This heavily weighted problem has been solved by providing a universal portable radio for each generic hardware model type and the process to give the user immediate access to the radio system regardless of the model type of the defective radio. Information can be transferred between any portable radio model having the generic hardware type and the corresponding universal radio. This solution results in the field service centers only stocking one universal radio model for each generic hardware type. While the preferred embodiment uses three generic hardware types which categorize high, medium and low tier portable radios, an alternate embodiment may use only one universal radio for all radio model types. The preferred embodiment does not combine the three generic hardware types for the sake of customer familiarity and marketing definition. While the preferred embodiment of the present invention, a universal radio and information transfer process, relates to portable cellular radios and generic hardware types, the spirit and scope of the invention comprises a much broader concept. The invention may comprise an intelligent communication device and the process which adapts its memory to that memory associated with any one of any other communication device for subsequent independent operation in the radio system. The specific communication device, may be a receiver, transmitter or transceiver. It may be portable, mobile or fixed. It may have any feature set, hardware configuration or software configuration. It may even be manufactured by a variety of sources. The broadest necessary requirement is that the communication devices be compatible with the radio system and that the intelligent communication device knows the configuration of each device in the system.

Figure 2:
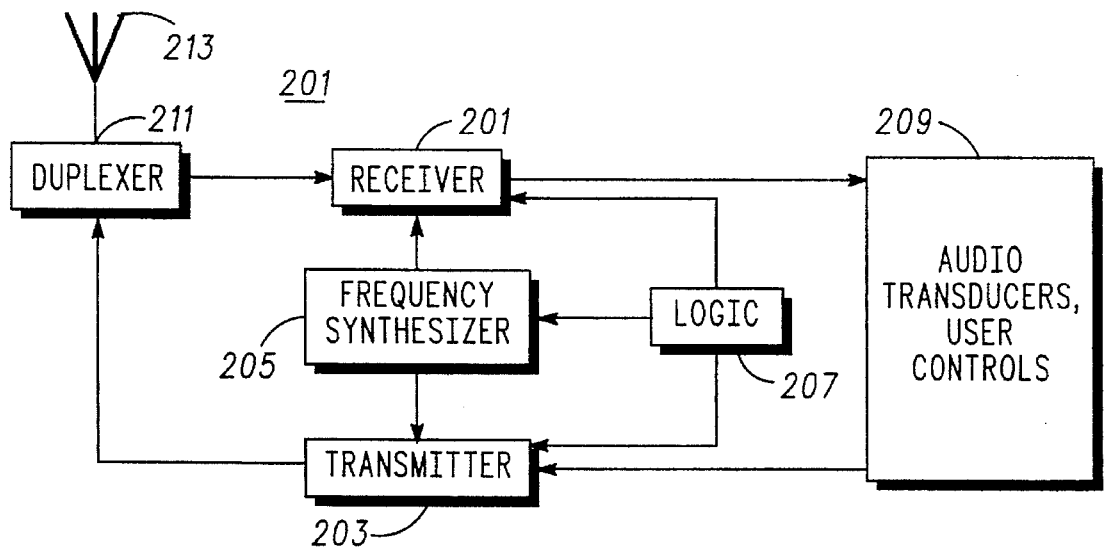
FIG. 2 is a block diagram of a mobile or portable radiotelephone in accordance with the present invention.

A universal radio which may advantageously employ the present invention is shown in a block diagram of FIG. 2. The universal radio consists of a transceiver portion 201, a transmitter portion 203, and frequency synthesizer portion 205, a logic portion 207, and audio transducers and user controls 209. A duplexer 211 couples an antenna 213 to the receiver portion 201 and couples a transmitter 203 to the antenna 213 in such a manner that receiver signals and transmit signals may be received and transmitted essentially without interference to each other.

The present invention resides primarily in the logic portion 207. A block diagram of the logic portion 207 employing the present invention is shown in more detail in FIG. 3. In the preferred embodiment, the logic portion 207 is a microcomputer which consists primarily of a call processor microprocessor 301 (which may be a commercially available microprocessor such as an MC68HC11 available from Motorola, Inc. or equivalent. Internal to this microprocessor will be EEPROM containing among other things ESN, NAM, internal repertory directory and feature set), a signalling interface circuit 303 (which may be a custom integrated circuit providing address decoding, data decoding and tone generation), and microprocessor memory. The microprocessor memory includes conventional 64K by 8 EPROM 305 containing a unique executive program, a ROM 306, conventional RAM 307, and EEPROM 309 containing external directory repertory. An audio processing interface 311 provides interface between the microcomputer bus and other radio transceiver functions. Interface between the microcomputer and the user controls/audio transducers portion 209 is accomplished, in the preferred embodiment, via a three-wire computer bus such as that described in U.S. Pat. No. 4,369,516. Interface between the microcomputer and an external microcomputer (such as that which would temporarily be connected to receive or send an information set) is accomplished via an RS232 interface. In the preferred embodiment, the RS232 interface and the user controls/ audio transducers portion 209 interface is realized through connection to a microprocessor 301.

Figure 4A:
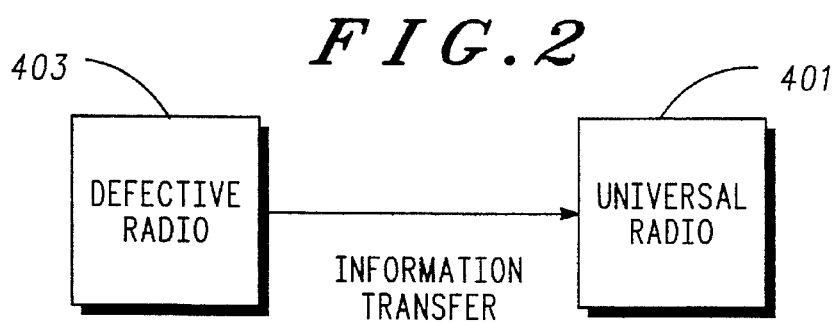
FIG. 4a is a block diagram of the essential elements necessary for transfer of an information set from the defective radio to the universal radio.
Figure 4B:
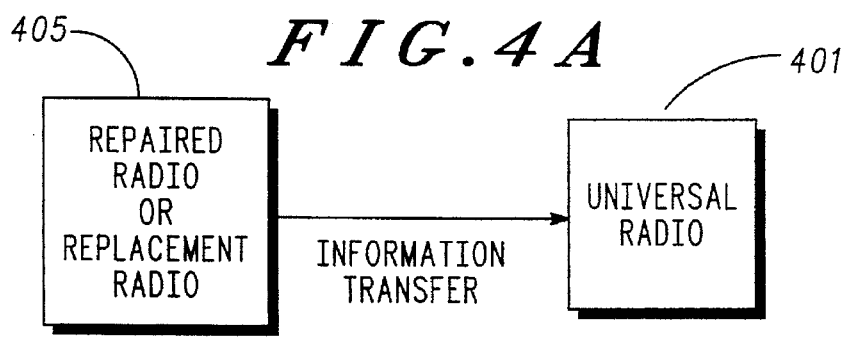
FIG. 4b is a block diagram of the essential elements necessary for the transfer of information from a repaired radio or replacement radio to the universal radio.
Figure 4C:
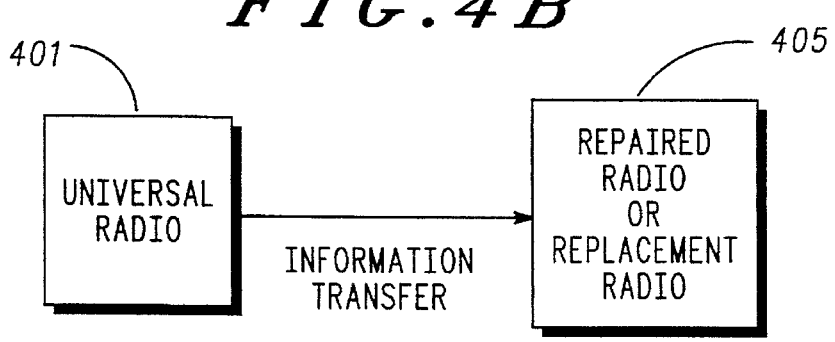
FIG. 4c is a block diagram of the essential elements necessary for the transfer of information from the universal radio to the repaired radio or the replacement radio.

FIGS. 4A, 4B, and 4C diagrammatically show a three step process for transferring information between a specific model radio and a universal radio. Step one is illustrated in FIG. 4A wherein an information set is transferred from the defective radio 403 to the universal radio 401. The universal radio 401 acts as a controller which adapts its memory to that of the defective radio 403. The universal radio 401 now contains in its memory the ESN, NAM, repertory directory and feature set of the defective radio. The defective radio retains in its memory the NAM, repertory directory and feature set, but no longer retains the ESN. The user now has the capability of operating the universal radio 401 in the radio system, independent of the defective radio 403, while the defective radio 403 is being repaired. The universal radio is then upgraded to step 2.

Step two is illustrated in FIG. 4B wherein the information set is transferred from the repaired or replacement radio 405 to the universal radio 401. Again, the universal radio 4.01 acts as a controller to adapt its memory to that of the repaired or replacement radio 405. The information set transferred includes the NAM, internal repertory directory and the feature set. The ESN is not requested by the universal radio in step 2 because the user's ESN remains present in the universal radio 401 as a result of step 1. The universal radio 401 will compare the information transferred from the repaired or replacement radio 405 with the information set received from the defective radio 403 in step 1 to determine if any updates should be made. The universal radio is then upgraded to step 3.

Step 3 is illustrated in FIG. 4C wherein an updated information set is transferred from the universal radio 01 to the repaired or replacement radio 405. The universal radio 401 now acts like a slave device which responds to the repaired or replacement radio 405 by downloading its memory contents. The ESN, NAM, repertory directory and feature set now reside in the repaired or replacement radio 405 thereby giving the user continued operation in the radio system. Once the information transfer has been completed, the universal radio will reset itself to step 1 thus allowing the 3 step process to be repeated.

Two main advantages of the aforementioned three step information transfer process include providing the user with continuous operability in the radio system and giving the field service centers the convenience of only stocking the three tiers of universal radio types rather than hundreds of radio model types.

Figure 3:
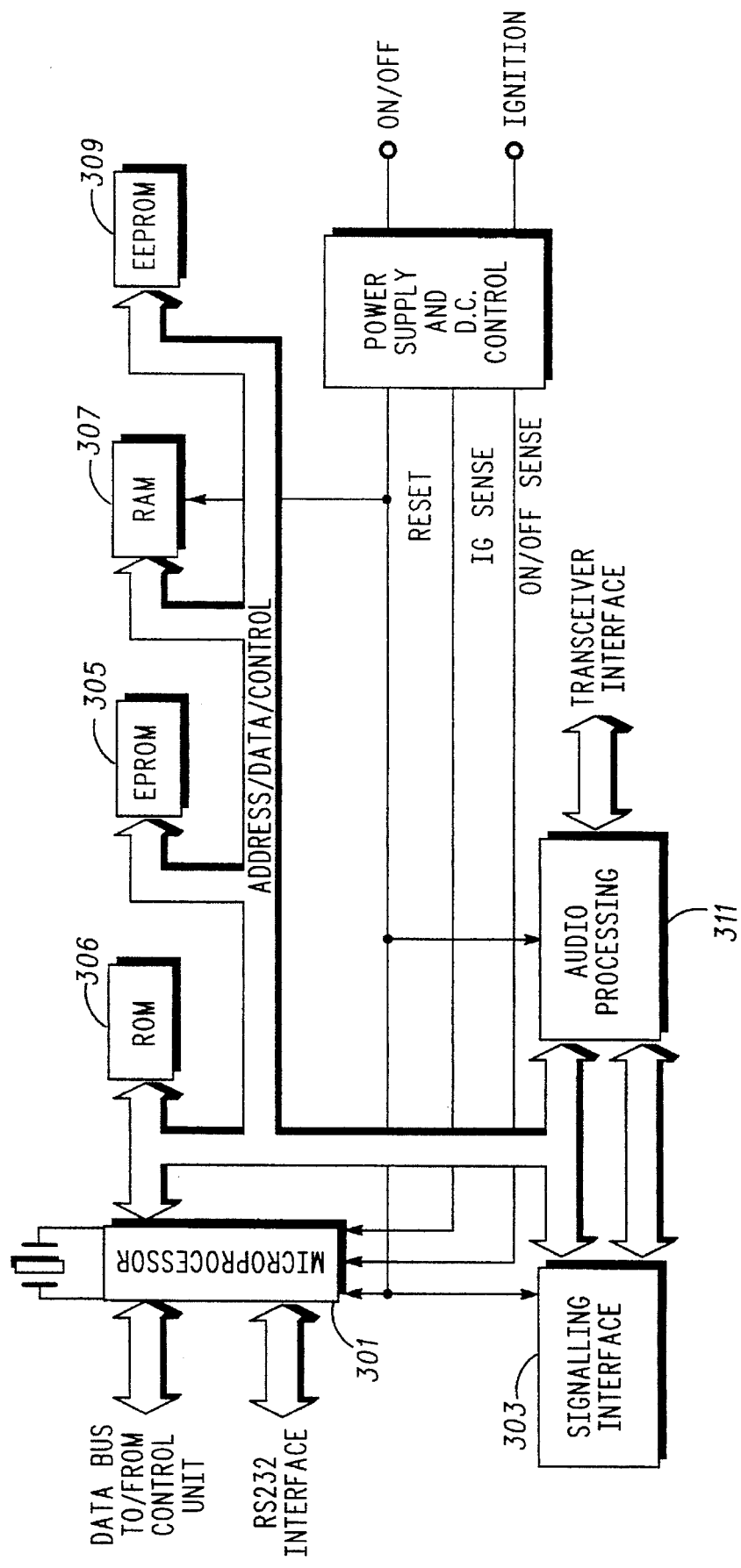
FIG. 3 is a block diagram of the logic unit portion of the radio telephone of FIG. 2 in accordance with the present invention.
Figure 5:
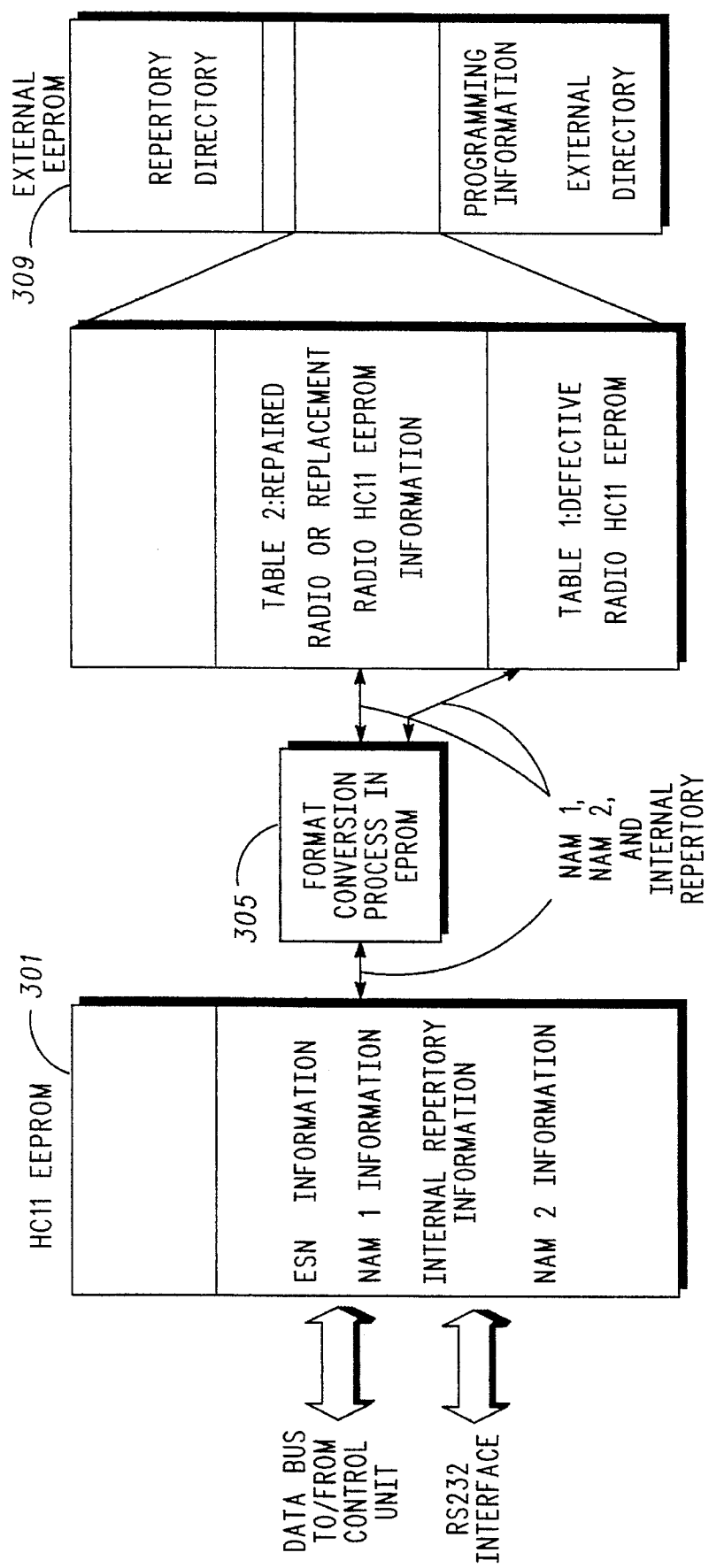
FIG. 5 is a block diagram of the relationship between the microprocessor, EPROM and EEPROM elements of FIG. 3 which are included in the universal radio.
Figure 6A:
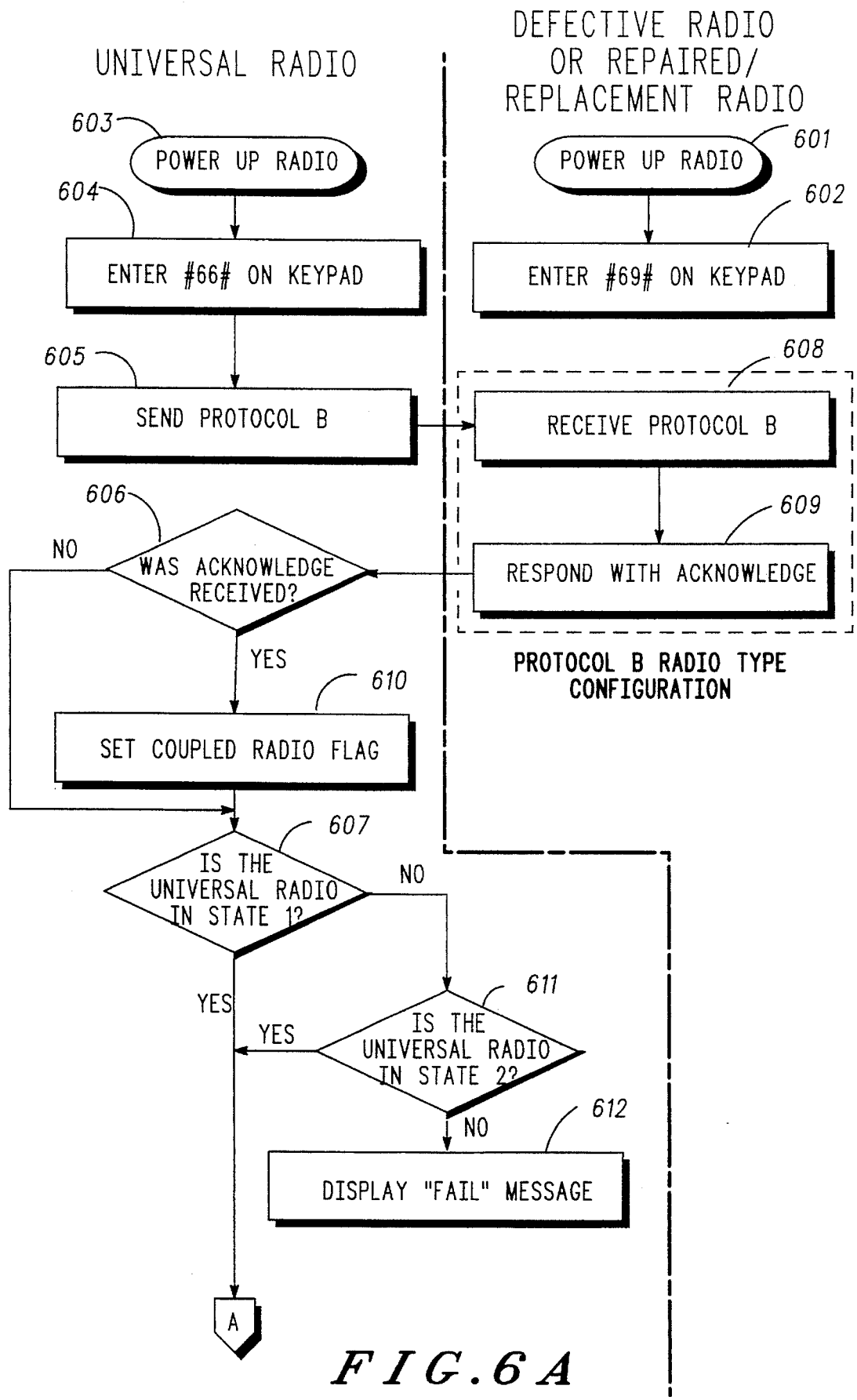
FIGs. 6a, 6b, 6c, 6d, 6e and 6f taken together are a flow chart illustrating the process of transferring information from the defective, or repaired or replacement radiotelephone to the universal radiotelephone in accordance with the present invention.
Figure 6B:
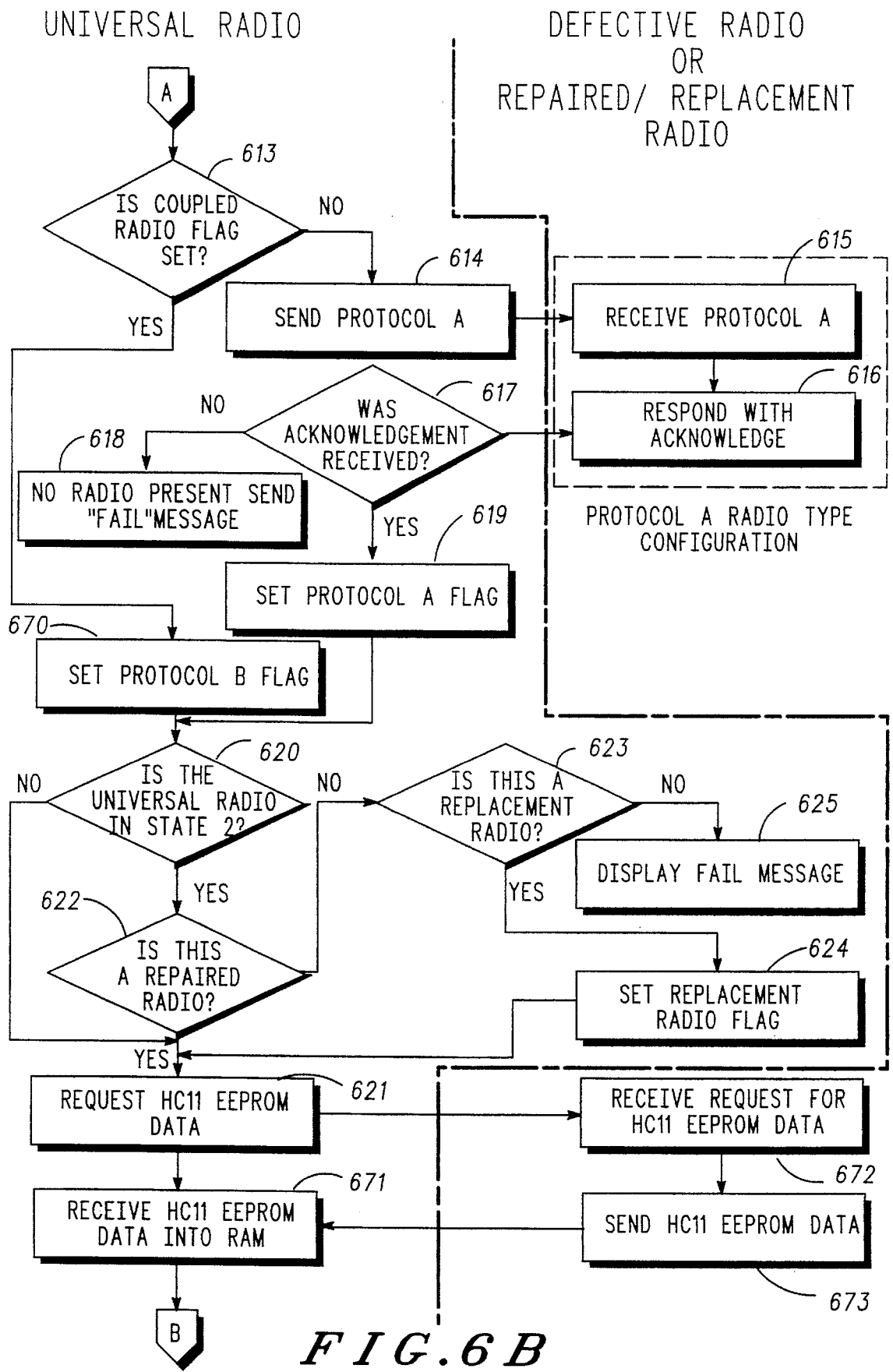
Figure 6C:
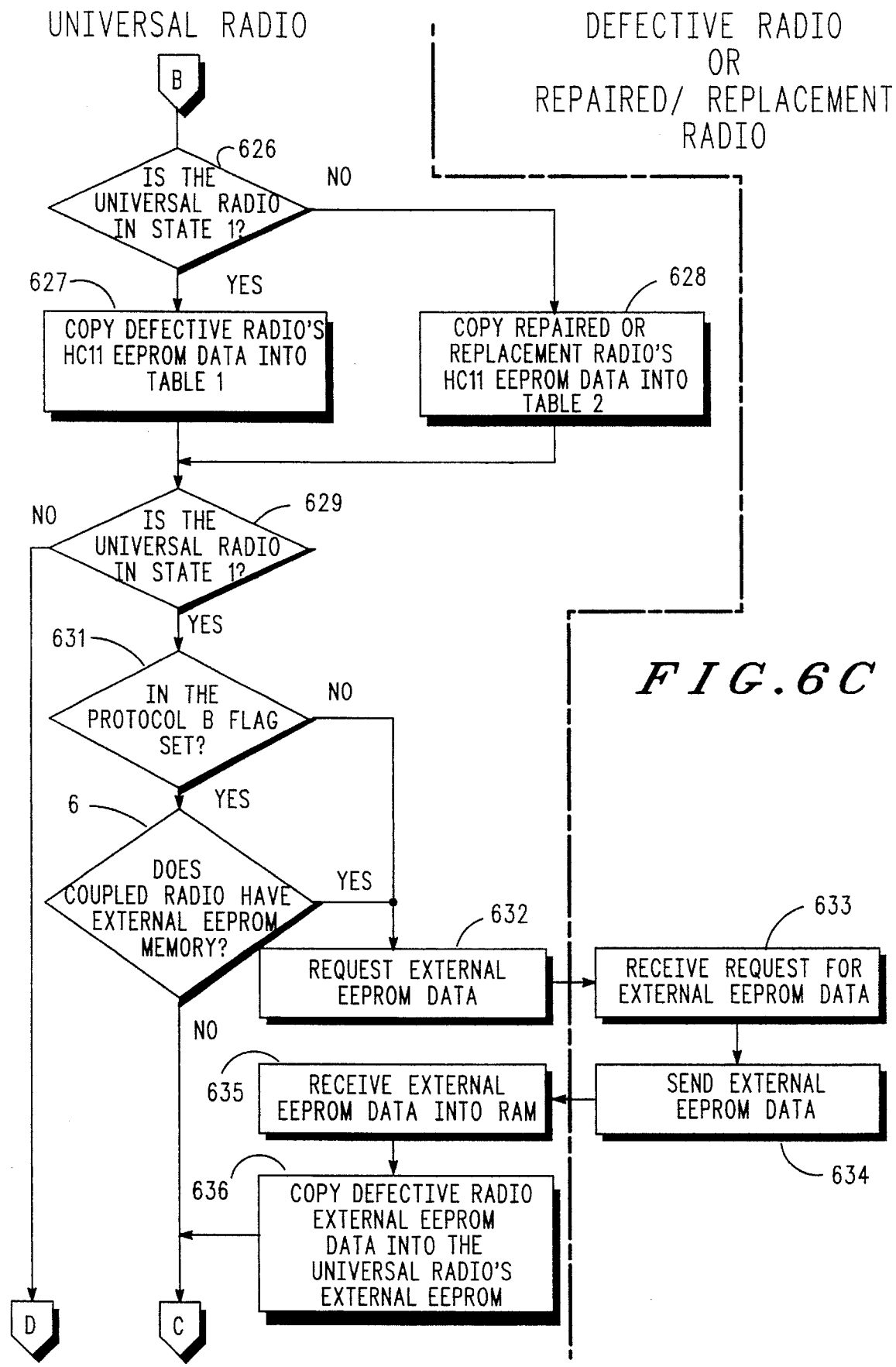
Figure 6D:
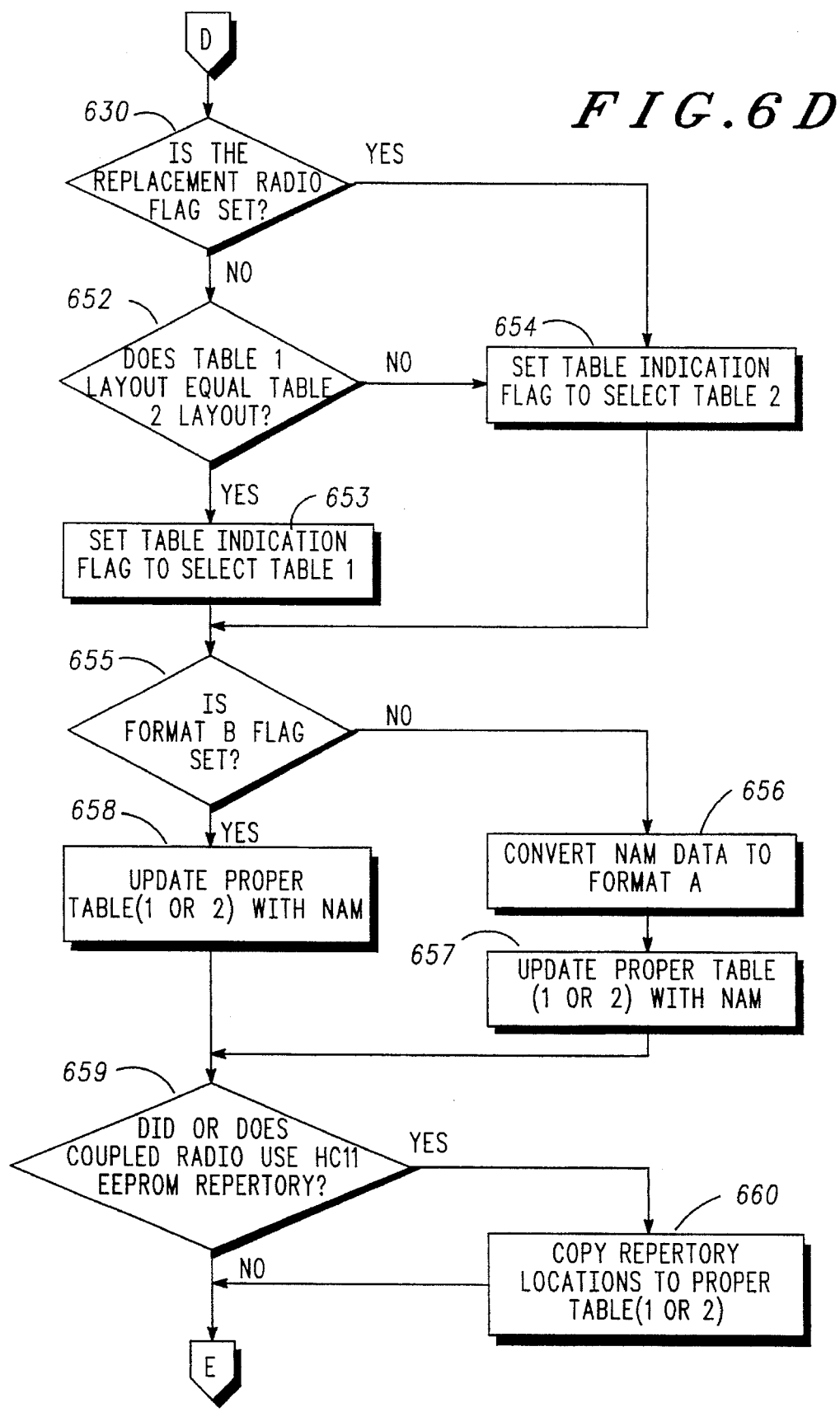
Figure 6E:
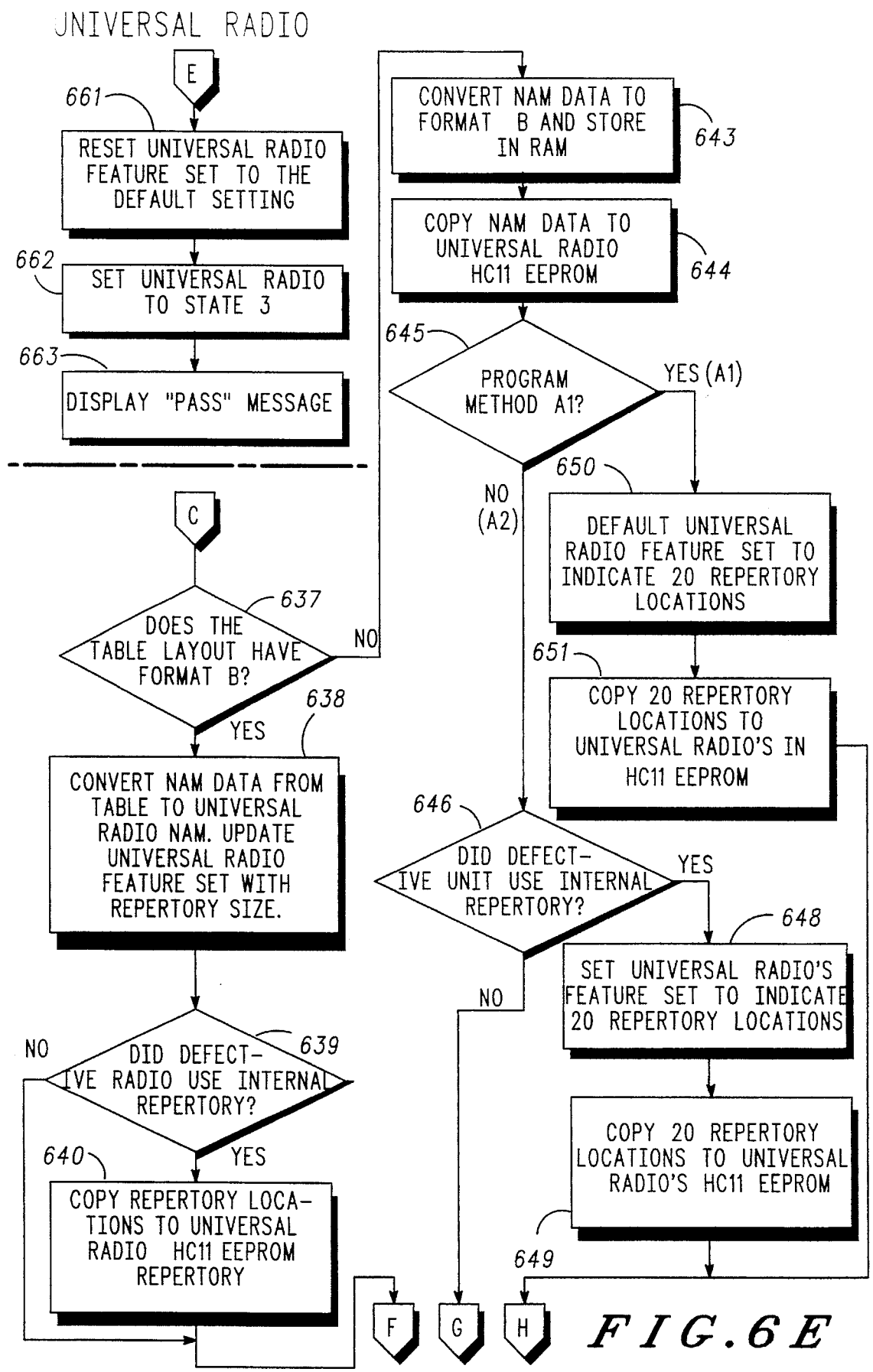
Figure 6F:
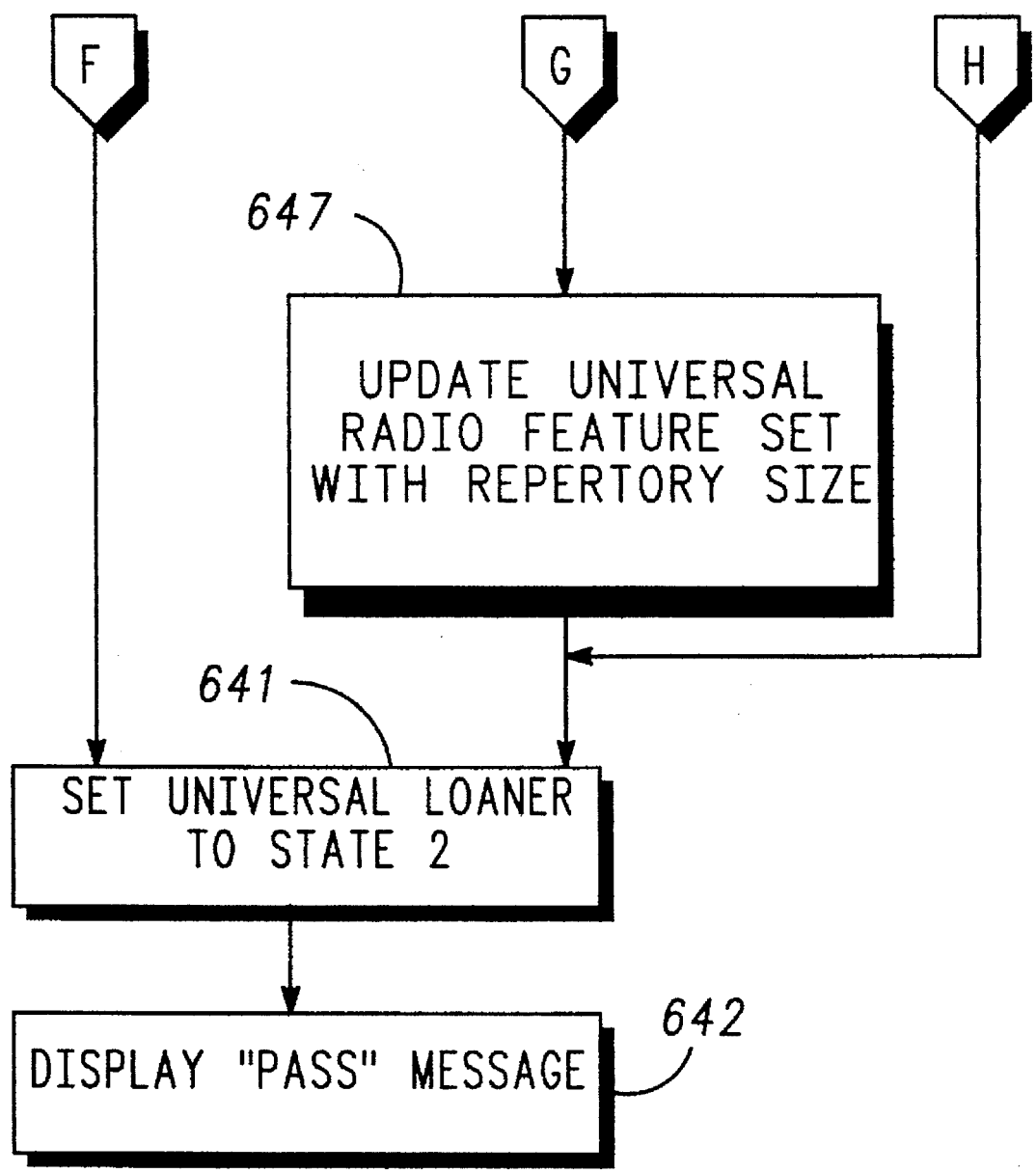

FIG. 5 is a block diagram of the relationship between the microprocessor 301, EPROM 305 and EEPROM 309 of FIG. 3 which are included in the universal radio. Once communication has been established between the universal radio 401 and the defective radio 403, the universal radio 401 will request the information set residing in the defective radios' HC11 EEPROM. The information set is stored in table 1 of the external EEPROM 309 in the universal radio 401. The ESN in the defective radio's HC11 EEPROM is directly transferred to the HC11 EEPROM in the universal radio for secure reasons. The information set is analyzed to determine the NAM, repertory directory and feature set. The universal radio 401 converts the defective unit's NAM1, NAM2, and internal repertory information stored in table 1 into its own HC11 EEPROM memory format. The conversion process is controlled by a predetermined program held in the EPROM 305. Step 1 is now completed in the universal radio advances to step 2.

After the user's defective radio 403 has been repaired or if the user's radio could not be repaired and a replacement radio is returned to the field service center, the repaired or replacement radio 405 is intercoupled with the universal radio 401. The universal radio 401 again adapts its memory to that of the repaired or replacement radio 405. Once communication has been established between radios, the universal radio 401 determines whether it is communicating with the repaired radio or replacement radio. Once the determination has been made, the universal radio 401 requests the information set from the HC11 EEPROM in the repaired or replacement radio 405 and stores the information set in the universal radio's external EEPROM 309 in table 2. The information set in table 2 is compared to the information set in table 1. If the external radio 405 is the same model as the customer's originally defective radio, the universal radio will update table 1 with any changes to NAM1, NAM2 and internal repertory information if applicable. If the external radio 405 is a new replacement model the universal radio 401 updates table 2 with NAM1, NAM2 and internal repertory information if applicable. Step 2 has now been completed and the universal radio advances to step 3.

In step 3, the repaired or replacement radio 405 retrieves the updated information from the universal radio. The universal radio 401 sends the information set to the repaired or replacement radio 405 from either table 1 or table 2 as determined by step 2. Once the information transfer has been completed, the universal radio 401 resets itself to state 1 allowing the process to be repeated.

FIG. 6A, 6B, 6C and 6D illustrates a flow chart in accordance with the present invention which may be used to implement the operation of the EPROM 305 of FIG. 3. The operation describes the information transfer process of step 1 as shown in FIG. 4A and step 2 as shown in FIG. 4B. Step 1 and 2 are combined within one flowchart since the information transfer process is similar. The defective or repaired/replacement radio will hereinafter be referred to as a coupled radio. Generally, the flowchart includes: establishing communication protocol; transferring information from the coupled radio's HC11 $E^2$PROM to the universal radio's external EEPROM; transferring information from the coupled radio's external $E^2$PROM to the universal radio's external EEPROM; selecting the proper table within the universal radio's external EEPROM, converting the coupled radio's information from the table to the proper format and then updating the universal radio's HC11 EEPROM information or selecting the universal radio's HC11 EEPROM information, converting the information to the proper format and then updating the proper table in the universal radio's external EEPROM with the information.

The flow chart begins at block 601 where the power to the coupled radio is switched on first and the keystrokes #69# are entered through the keypad at block 602 attached to the radio, enabling the coupled radio to receive data and send data. Likewise, the power to the universal radio is switched on second at block 603 and the keystrokes #66# are entered at block 604 through the keypad attached to the radio enabling the radio to send data and receive data.

At block 605, the universal radio attempts to establish whether the coupled radio communicates using protocol A or B. The universal radio sends a protocol B message. If an acknowledge to the protocol B message is not received at block 606(meaning the coupled radio uses protocol A) the flow continues to block 607 where the universal radio determines its state of information transfer. If communication is established, the coupled radio receives the protocol B message at block 608 and responds to the universal radio with an acknowledge message at block 609. If the universal radio receives the acknowledge message at block 606 a coupled radio flag is set at block 610.

At block 607, the universal radio determines if it is in state 1. If it is not in state 1, the universal radio checks to see if it is in state 2 at block 611. If it is not in state 2 (meaning it must be in state 3), a "FALL" message is displayed on the universal radio at block 612. If the universal radio is in either state 1 or state 2, it checks to see if a coupled radio is present at block 613.

If a coupled radio is present, communication with a protocol B radio type configuration has been established and the flow continues to block 670 wherein a protocol B flag is set. The universal radio determines if it is in state 2 at block 620. If it is in state 1, the coupled radio is a defective radio and the universal radio request that HC11 EEPROM data be sent at block 621. If it is in state 2, the universal radio determines if the coupled radio is the repaired radio or the replacement radio at block 622. If it is a repaired radio, the universal radio requests HC11 EEPROM data to be sent at block 621. If it is not a repaired radio, the universal radio determines if the coupled radio is a replacement radio at block 623. If it is a replacement radio, the replacement radio flag is set at block 624. If it is not recognized as a replacement, a "FALL" message at block 625 is displayed on the universal radio.

If the universal radio does not recognize a coupled radio present at block 613, a protocol A message is sent at block 614. If an acknowledge to the protocol A message is not received at block 617(meaning no radio is present), a "FALL" message at block 618 is displayed on the universal radio. If communication is established, the coupled radio radio receives the protocol A message at block 615 and responds with an acknowledge message at block 616. If the universal radio receives the acknowledgement message at block 617, it sets a protocol A flag at block 619.

Communication between the; universal radio and the coupled radio is now established. Next, information in the coupled radio's HC11 EEPROM is sent to the universal radio's external EEPROM.

At block 621, the universal radio requests HC11 EEPROM data from the coupled radio. At block 672, the coupled radio receives the request and responds by sending the data at block 673. At block 671, the universal radio receives and stores the data in RAM. The data sent comprises the; information set including: the NAM, internal repertory, and feature set. If the universal radio is in state 1, the ESN is transferred from the defective radio. If the universal radio is in state 2, the universal radio does not request the ESN during the transfer. At block 626, the universal radio determines if it is in state 1, If it is in state 1, the data stored in RAM is copied to table 1 in the external EEPROM at block 627. If it is in state 2, the data stored in RAM is copied to table 2 in the external EEPROM at block 628.

Next, information in the coupled radio's external EEPROM is sent to the universal radio's external EEPROM. If the universal radio is in state 1, at block 629, data is sent from the coupled radio's external EEPROM. If the universal radio is in state 2, the table selection process begins at block 630.

At block 631, the universal radio recalls the protocol of the coupled radio. If protocol A is used, the universal radio requests external EEPROM data from the coupled radio at block 632. At block 633, the coupled radio receives the request for external EEPROM data and responds by sending the data to the universal radio at block 634. At block 635, the universal radio receives the external E$^2$PROM data into its RAM. At block 636, the data in RAM is transferred into the universal radio's external E$^2$PROM.

At block 631, if the coupled radio is configured for protocol B format, the universal radio recalls if the coupled radio has external EEPROM memory. If it does not have external memory, the flow continues to block 637 for further processing of the data in table 1. If it does have external memory, the flow continues at block 632 to request external EEPROM data and continues to store the data in the universal radio's external EEPROM as previously described.

Next, if the universal radio is in state 1, it converts the memory map format of table 1 in its external EEPROM to the memory map format of its HC11 EEPROM. The information converted comprises the NAM, feature set and the internal repertory locations. Formats A and B may be used. At block 637, the universal radio determines if the external EEPROM uses format B. If format B is used, the NAM data is transferred from table 1 in the external EEPROM to the universal radio's NAM location in the HC11 EEPROM at block 638.

At block 639, the universal radio determines if the defective unit used the repertory directory in the HC11 EEPROM. If it used the HC11 EEPROM directory, the repertory locations from table 1 are copied to the HC11 EEPROM in the universal radio at block 640. If the defective radio did not use the HC11 EEPROM directory (meaning the directory is in the external EEPROM) or after the repertory locations are copied at block 640, the universal radio is advanced to state 2 at block 641 and a "PASS" message is displayed on the universal radio at block 642.

If the defective radio used format A, determined at block 637, the NAM data is converted into format B and stored in RAM at block 643 and copied to the HC11 EEPROM in the universal radio at block 644.

At block 645, the universal radio determines how the defective radio was programmed. Programming method A1 and A2 may have been used. If it was programmed using method A2, the universal radio determines if HC11 EEPROM repertory storage was used at block 646. If the defective radio did not use HC11 EEPROM repertory storage, the universal radio establishes the amount of external memory used by the defective radio at block 647 and updates it's feature set to reflect the specified amount of repertory.

At block 646, if the defective unit used HC11 EEPROM repertory, the universal radio's feature set is set to indicate 20 repertory locations at block 648 and copies the 20 repertory locations from table 1 to the universal radio's HC11 EEPROM repertory locations at block 649.

At block 650, if the defective radio was programmed using method A1, the universal radio defaults it's feature set to indicate 20 repertory locations at block 697. At block 651, the 20 repertory locations are copied from table 1 to the repertory locations in the universal radio's HC11 EEPROM.

Once the universal radio has been updated with the feature set (block 638 for format B, or blocks 647 or 648 or 650 for format A), HC11 EEPROM repertory if it is to be used (block 640 for format B, or blocks 649 or 651 for format A) the universal radio is set to state 2 at block 641 and a "PASS" message is sent to the universal radio's display at block 642.

At block 630, the universal radio in state 2, recalls if the coupled radio is a repaired or replacement radio. If it is a repaired radio, table 1 and table 2 are compared at block 652. Comparing tables 1 and 2 determines if the information set in the coupled radio is the same as the information set transferred into the universal radio during step 1. If the tables compare, a flag is set to select table 1 at block 653. If the coupled radio is a replacement radio or if table 1 and table 2 do not compare a table indication flag is set to select table 2 at block 654.

At block 655, the universal radio checks wether the repaired or replacement radio uses format B. If format A is used, the NAM data is converted to format A at block 656 and the proper table (1 or 2) is updated with NAM at block 657. If format B is used by the repaired or replacement radio, the proper table (1 or 2) is updated with NAM information at block 658.

At block 659, the universal radio determines if the repaired or replacement radio used HC11 EEPROM as repertory storage. If it did use the HC11 EEPROM as repertory storage, those repertory locations are copied to the proper table (1 or 2) at block 660. If it did not use the HC11 EEPROM as repertory storage, the universal radio resets it's feature set to the default setting at block 661, the universal radio advances to step 3 at block 662 and a "PASS" message is displayed on the universal radio at block 663.

Figure 7:
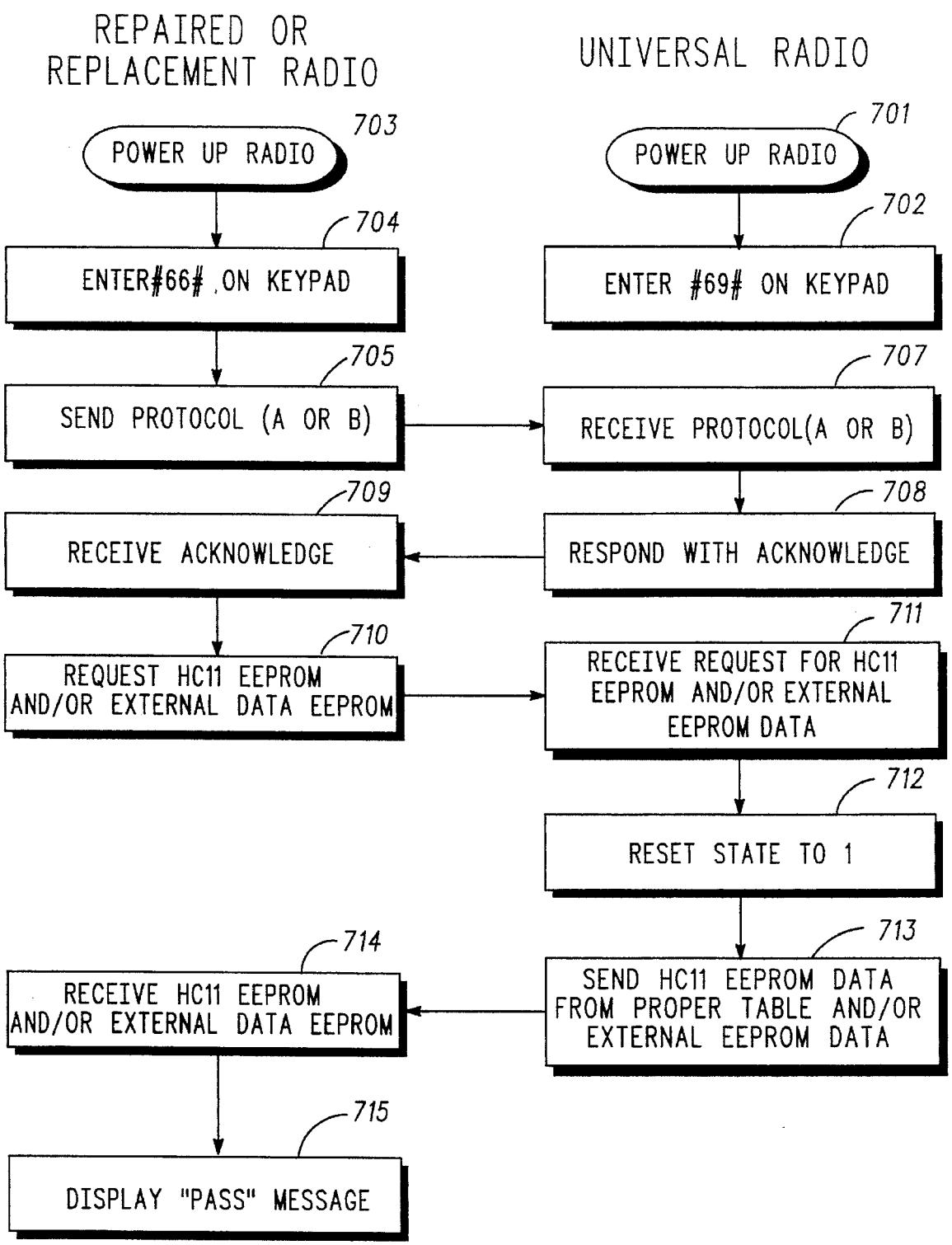
FIG. 7 is a flow chart illustrating the process of transferring radio information from the universal radiotelephone to the repaired or replacement radiotelephone in accordance with the present invention.

FIG. 7 illustrates a flow chart, in accordance with the present invention which may be used to implement the operation of the EPROM 305 of FIG. 3. FIG. 7 illustrates in detail the information transfer process from the universal radio to a repaired or replacement radio as previously described in FIG. 4C.

At block 701, the universal radio is powered up first and at block 702 the keystrokes #69# is entered through the keypad enabling the radio to receive and send data. Likewise, at block 703 the power to the repaired or replacement radio is switched on second and at block 704 the keystrokes #66# is entered through the keypad enabling the radio to receive and send data.

The repaired or replacement radio sends a protocol (A or B message, depending on the model of the repaired or replacement radio) message to the universal radio. At block 707, the universal radio receives the protocol message and, at block 708 responds with an proper protocol acknowledge message.

The repaired or replacement radio receives the acknowledged message at block 709 and requests HC11 EEPROM and/or external EPROM data from the universal radio at block 710. At block 711, the universal radio receives the request for the HC11 EEPROM data and/or external EEPROM data.

At block 712, the universal radio is reset to state 1 and at block 713, HC11 EEPROM data from the proper table (1 or 2) and/or external EEPROM data is sent to a repaired or replacement radio.

At block 715, the repaired or replacement radio displays a "PASS" message.

What is claimed is:

1. In a radio system including a base station and a plurality of subscriber radios, a method of operating a universal subscriber radio comprising the steps of:

receiving and storing a first information set sent from a first subscriber radio permitting the universal subscriber radio to communicate with the base station independently of and alternatively to the first subscriber radio in the radio system;

receiving and storing a second information set sent from a second subscriber radio;

modifying the first information set with information in the second information set that is different from information in the first information set to produce a modified information set; and sending the modified information set to the second subscriber radio permitting the second subscriber radio to communicate with the base station independently of and alternatively to the universal subscriber radio in the radio system.

2. A method according to claim 1 wherein the first information set further comprises a first feature set, NAM, serial number and repertory information and the second information set further comprises a second feature set.

3. A method according to claim 1 wherein the step of modifying further comprises reformatting the modified information set permitting the second subscriber radio to operate with the modified information set.

4. A method according to claim 1 wherein the first subscriber radio is a defective subscriber radio and the second subscriber radio is a replacement subscriber radio substantially different from the defective subscriber radio.

5. In a radio system including a base station and a plurality of subscriber radios, a method of operating a universal subscriber radio comprising the steps of:

receiving and storing an information set sent from a subscriber radio permitting the universal subscriber radio to communicate with the base station independently of and alternatively to the subscriber radio in the radio system;

modifying at least part of the information set to produce a modified information set; and sending the modified information set to the subscriber radio permitting the subscriber radio to communicate with the base station independently of and alternatively to the universal subscriber radio in the radio system.

6. A method according to claim 5 wherein the subscriber radio is a defective subscriber radio in the step of receiving and a repaired subscriber radio in the step of sending.

7. A method according to claim 5 wherein the information set further comprises a feature set, NAM, serial number and repertory information and the modified part of the information set further comprises at least one of the feature set, NAM and repertory information.

8. In a radio system including a base station and a plurality of subscriber radios, a universal subscriber radio comprising:

means for receiving and storing a first information set sent from a first subscriber radio permitting the universal subscriber radio to communicate with the base station independently of and alternatively to the first subscriber radio in the radio system;

means for receiving and storing a second information set sent from a second subscriber radio;

means for modifying the first information set with information in the second information set that is different from information in the first information set to produce an modified information set; and means for sending the modified information set to the second subscriber radio permitting the second subscriber radio to communicate with the base station independently of and alternatively to the universal subscriber radio in the radio system.

9. A universal subscriber radio according to claim 8 wherein the first information set further comprises a first feature set, NAM, serial number and repertory information and the second information set further comprises a second feature set.

10. A universal subscriber radio according to claim 8 wherein the means for modifying further comprises means for reformatting the modified information set permitting the second radio to operate with a reformatted modified information set.

11. A universal subscriber radio according to claim 8 wherein the first subscriber radio is a defective radio and the second subscriber radio is a replacement subscriber radio substantially different from the defective subscriber radio.

12. In a radio system including a base station and a plurality of subscriber radios, a universal subscriber radio comprising:

means for receiving and storing an information set sent from a subscriber radio permitting the universal subscriber radio to communicate with the base station independently of and alternatively to the subscriber radio in the radio system;

means for modifying at least part of the information set to produce a modified information set; and means for sending the modified information set to the subscriber radio permitting the subscriber radio to communicate with the base station independently of and alternatively to the universal subscriber radio in the radio system.

13. A universal subscriber radio according to claim 12 wherein the information set is sent from a defective subscriber radio to the universal subscriber radio and received by a repaired subscriber radio.

14. A universal subscriber radio according to claim 12 wherein the information set further comprises a feature set, NAM, serial number and repertory information and the modified part of the information set further comprises at least one of the feature set, NAM and repertory information.

15. A radio system comprising:

a base station;

first, second and third subscriber radios;

means for transferring a first information set from the first subscriber radio to the third subscriber radio permitting the third subscriber radio to communicate with the base station independently of and alternatively to the first subscriber radio;

means for transferring a second information set from the second subscriber radio to the third subscriber radio;

modifying the first information set with information in the second information set that is different from information in the first information set to produce a modified information set; and means for transferring the modified information set from the third subscriber radio to the second subscriber radio permitting the second subscriber radio to communicate with the base station independently of and alternatively to the third subscriber radio.

16. A radio system according to claim 15 wherein the first, second and third subscriber radios are defective, replacement and universal subscriber radios, respectively.

17. A radio system according to claim 15 wherein the first information set further comprises a first feature set, NAM, serial number and repertory information and the second information set further comprises a second feature set.

18. A radio system according to claim 15 wherein the means for modifying further comprises means for reformatting the modified information set permitting the second subscriber radio to operate with the reformatted modified information set.

19. A radio system comprising:

a base station;

first and second subscriber radios;

means for transferring a first information set from the first subscriber radio to the second subscriber radio permitting the second subscriber radio to communicate with the base station, independently of and alternatively to the first subscriber radio;

means for modifying at least part of the information set to produce a modified information set; and means for transferring the modified information set from the second subscriber radio to the first subscriber radio permitting the first subscriber radio to communicate with the base station independently of and alternatively to the second subscriber radio.

20. A universal subscriber radio according to claim 19 wherein the information set further comprises a feature set, NAM, serial number and repertory information and the modified part of the information set further comprises at least one of the feature set, NAM and repertory information.

21. In a radio system including a base station and a plurality of subscriber radios, a method of operating a universal subscriber radio comprising the steps of:

receiving and storing a first information set sent from a first subscriber radio permitting the universal subscriber radio to communicate with the base station independently of and alternatively to the first subscriber radio in the radio system;

detecting intercoupling with a second subscriber radio;

determining if the second subscriber radio is substantially the same as or different from the first subscriber radio;

if the second subscriber radio is determined to be substantially different from the first subscriber radio then perform the steps of:

receiving and storing a second information set sent from the second subscriber radio;

modifying the first information set with information in the second information set that is different from the information in the first information set to produce a modified information set; and sending the modified information set to the second subscriber radio permitting the second subscriber radio to communicate with the base station independently of and alternatively to the universal subscriber radio in the radio system; otherwise if the second subscriber radio is determined to be substantially the same as the first subscriber radio then perform the step of:

sending the first information set to the second subscriber radio permitting the second subscriber radio to operate independently of and alternatively to the universal subscriber radio in the radio system.

22. A method according to claim 21 further comprising modifying at least part of the first information set before being sent to the second subscriber radio when the second subscriber radio is determined to be substantially the same as the first subscriber radio.

\* \* \* \* \*